United States Patent
Myers

(10) Patent No.: US 9,550,216 B2
(45) Date of Patent: *Jan. 24, 2017

(54) JEWELRY WASHING MACHINE AND METHOD

(71) Applicant: SHADE SAVER, INC., Ocala, FL (US)

(72) Inventor: Bryan K. Myers, Ocala, FL (US)

(73) Assignee: SHADE SAVER, INC., Ocala, FL (US)

( * ) Notice: Subject to any disclaimer, the term of this patent is extended or adjusted under 35 U.S.C. 154(b) by 777 days.

This patent is subject to a terminal disclaimer.

(21) Appl. No.: 13/840,232

(22) Filed: Mar. 15, 2013

(65) Prior Publication Data
US 2013/0306111 A1    Nov. 21, 2013

Related U.S. Application Data

(63) Continuation-in-part of application No. 13/437,238, filed on Apr. 2, 2012.
(Continued)

(51) Int. Cl.
*B08B 3/02* (2006.01)
*B08B 3/14* (2006.01)
(Continued)

(52) U.S. Cl.
CPC . *B08B 3/02* (2013.01); *B08B 3/04* (2013.01); *B08B 3/14* (2013.01); *B08B 11/02* (2013.01);
(Continued)

(58) Field of Classification Search
CPC ............. G07F 17/20; G04D 3/00; G04D 3/08; G04D 3/083; A47L 25/02
See application file for complete search history.

(56) References Cited

U.S. PATENT DOCUMENTS

| 1,292,407 A | | 1/1919 | Spicer |
| 2,905,328 A | * | 9/1959 | Munao ...................... A47F 7/02 |
| | | | 211/59.1 |

(Continued)

FOREIGN PATENT DOCUMENTS

| DE | 101 54 161 A1 | 5/2003 | |
| DE | 10154161 A1 | * 5/2003 | ........... G02C 13/006 |

(Continued)

OTHER PUBLICATIONS

English Machine Translation of DE 10154161 A1.*
(Continued)

*Primary Examiner* — Nicole Blan
(74) *Attorney, Agent, or Firm* — Oliff PLC

(57) ABSTRACT

A machine is presented for the cleaning of jewelry. The machine allows the manual or automatic cleaning of jewelry. Under both modes of operation, the jewelry is secured by a user to a support bracket inside a transparent, water-tight cylindrical wash chamber. When in manual mode, the user can direct the spray of wash fluid onto the jewelry by rotating the jewelry using a trackball. When used in automatic mode, the machine washes the jewelry during a preset washing cycle. For both modes, the washing cycle is followed by the drying cycle where a blower directs air onto the jewelry for a set time period to blow off excess moisture. The drying cycle concludes with a blower venting the cylindrical wash chamber to remove residual moisture from the wash chamber and the jewelry. After the cleaning, the user removes the jewelry from the machine.

20 Claims, 8 Drawing Sheets

Related U.S. Application Data

(60) Provisional application No. 61/469,857, filed on Mar. 31, 2011.

(51) Int. Cl.
*B08B 3/04* (2006.01)
*B08B 11/02* (2006.01)
*G02C 13/00* (2006.01)
*G04D 3/08* (2006.01)

(52) U.S. Cl.
CPC .............. *G04D 3/083* (2013.01); *B08B 3/022* (2013.01); *G02C 13/006* (2013.01)

(56) References Cited

U.S. PATENT DOCUMENTS

| | | | |
|---|---|---|---|
| 3,259,139 A | 7/1966 | Bell | |
| 3,480,022 A | 11/1969 | Richardson | |
| 3,552,701 A * | 1/1971 | Montagano | B60R 1/12 211/85.1 |
| 4,034,432 A | 7/1977 | Sullivan | |
| 4,112,955 A * | 9/1978 | Gollel | G07F 17/20 134/143 |
| 4,128,224 A * | 12/1978 | Guichard | A47F 7/021 248/305 |
| 4,157,097 A | 6/1979 | Miya | |
| 4,196,487 A | 4/1980 | Merriman | |
| 4,632,351 A * | 12/1986 | Coon | A47G 29/08 206/566 |
| 5,085,388 A * | 2/1992 | Creutz | A47F 7/021 248/206.5 |
| 5,134,101 A * | 7/1992 | Yamada | C04B 35/495 501/136 |
| 5,143,101 A | 9/1992 | Mor | |
| 5,335,394 A | 8/1994 | Cunningham, Jr. et al. | |
| 5,794,635 A | 8/1998 | Maines | |
| 6,056,130 A * | 5/2000 | Ovadia | A47F 7/02 206/566 |
| 6,076,538 A | 6/2000 | Frankson | |
| 6,129,097 A | 10/2000 | Papandrea | |
| 6,338,350 B1 | 1/2002 | Ewen | |
| 6,415,803 B1 * | 7/2002 | Sundin | B08B 3/00 134/108 |
| 6,539,957 B1 | 4/2003 | Morales, Jr. | |
| 6,578,589 B1 * | 6/2003 | Mayusumi | H01L 21/67034 134/61 |
| 6,719,850 B2 | 4/2004 | Glucksman et al. | |
| 7,257,319 B1 | 8/2007 | Clarke | |
| 7,448,398 B2 | 11/2008 | Glucksman et al. | |
| 2003/0040352 A1 * | 2/2003 | Marks | G07F 17/3293 463/13 |
| 2003/0136429 A1 * | 7/2003 | Scranton | B08B 3/08 134/30 |
| 2003/0201004 A1 | 10/2003 | Cooley | |
| 2004/0244106 A1 * | 12/2004 | Chesters | A61H 35/02 4/620 |
| 2008/0289971 A1 * | 11/2008 | Shigihara | A61L 2/025 205/687 |

FOREIGN PATENT DOCUMENTS

| | | | | |
|---|---|---|---|---|
| GR | WO 2009138807 A1 * | 11/2009 | | B08B 1/04 |
| JP | S59-118305 U | 8/1984 | | |
| JP | S60-76554 U | 5/1985 | | |
| JP | H10-3062 A | 1/1998 | | |
| JP | H11-128777 A | 5/1999 | | |
| JP | H11-333498 A | 12/1999 | | |
| JP | 2005-173452 A | 6/2005 | | |
| JP | 2005173452 A * | 6/2005 | | |
| WO | WO 94/22041 | 9/1994 | | |

OTHER PUBLICATIONS

English Machine Translation of JP 2005-173452 A.*
May 29, 2012 Written Opinion of the International Search Authority and International Search Report issued in PCT/US2012/031818.
Dec. 15, 2014 Second Office Action issued in Chinese Application No. 201280017106.1.
Apr. 13, 2015 Notification to Grant Patent Right for Invention issued in Chinese Application No. 201280017106.1.
Apr. 28, 2015 Office Action issued in Japanese Application No. 2014-502903.
Jul. 9, 2014 First Office Action issued in Chinese Patent Application No. 201280017106.1 w/English-language Translation.
Aug. 21, 2015 Office Action issued in U.S. Appl. No. 13/437,238.
European Patent Office, Written Opinion dated Nov. 8, 2013 in European Patent Application No. 12714470.7.
Nov. 2, 2015 Office Action issued in U.S. Appl. No. 13/437,238.

* cited by examiner

JEWELRY WASHING MACHINE AND METHOD

CROSS REFERENCE TO RELATED APPLICATION

This nonprovisional utility patent application claims the benefit of its copending parent application Ser. No. 13/437,238 entitled "Eyewear Washing Machine and Method" which was filed on Apr. 2, 2012 pursuant to 35 U.S.C. §120. and claims priority of prior Provisional Application No. 61/469,857 filed on Mar. 31, 2011. The entire disclosure of these applications are hereby incorporated by reference in their entirety.

BACKGROUND

1. Field of Invention

The invention relates to devices and methods for cleaning jewelry.

2. Related Art

Known jewelry cleaning devices use sonic technologies, pressurized steam and other cleaning chemicals to remove or dissolve foreign substances from jewelry. These devices are largely for personal use.

The most recent jewelry cleaning devices and methods are sonic cleaners, described in U.S. Pat. No. 6,719,850 issued to Glucksman et al. on Apr. 13, 2004, and U.S. Pat. No. 7,448,398 issued to Glucksman et al. on Nov. 11, 2008; steam cleaners, described in U.S. Pat. No. 6,129,097 issued to Edward Papandrea on Oct. 10, 2000 and U.S. Pat. No. 7,257,319 issued to Michael Clarke on Aug. 14, 2007; and a method describing a complete immersion in cleaning solution, without vibration, described in U.S. Pat. No. 6,076,538 issued to Jon Frankson on Jun. 20, 2000 and patents by others almost a half-century before that time.

U.S. Pat. No. 6,719,850 discloses a small, quiet, sonic cleaner where jewelry is immersed in a cleaning solution and vibrated in the sonic range. The patent also discloses the method for using the cleaner. The patent discloses hooks within the cleaning tank where jewelry can be fastened which rotate in response to the vibrations. U.S. Pat. No. 7,448,398 discloses an improvement over U.S. Pat. No. 6,719,850 in that it provides for removable tanks for ease of disposal and replacement of spent cleaning solutions. Both of these patents disclose machines that are primarily for in-home use.

U.S. Pat. No. 6,338,350 discloses a device which can be attached to a steam cleaning machine to clean jewelry. The device consists of a nozzle through which a jet of steam enters a closed mesh container that holds the jewelry being cleaned. The attachment is mounted to the steam cleaning machine through a support located at the open top of the neck portion of the attachment. This patent also teaches the use of tweezers through an opening in the mesh container which can be manipulated by the user to target the jet of steam onto the jewelry being cleaned.

U.S. Pat. No. 7,257,319 discloses a portable jewelry cleaning device that emits steam through a tube over the jewelry being cleaned. A containment device is optionally provided which catches any jewelry which is dislodged during cleaning. Unlike the disclosure in U.S. Pat. No. 6,338,350, this device houses a steam generator and is self contained. A water reservoir is also housed within the device which is filled by the user.

U.S. Pat. No. 6,076,538 discloses a jewelry cleaning kit and method wherein the user secures the jewelry in holding basket and dunks the basket with the jewelry into a cleaning solution. The basket with the jewelry is then placed in an automatic dishwasher for a final cleaning with a water spray and steam.

SUMMARY

People wear jewelry, such as rings, bracelets, wrist-watches, necklaces for their aesthetic appearance. Jewelry gathers dust, dirt, oil and other foreign substances through daily wearing activities. These foreign substances obstruct the entrance of light into precious stones and reduce the luster and overall appearance of the jewelry. In order to maintain the jewelry's luster and reflective properties, periodic cleaning is needed. This is especially true for jewelry worn daily such as wedding rings and wrist-watches. Manual cleaning methods are often ineffective for jewelry as it cannot address deeply embedded dirt.

As discussed above, related art has largely focused on personal devices for in home or commercial use. Some units cannot complete their utility without the use of secondary machines such as a steam cleaner or automatic dishwasher. References that are self-contained require the user to add water or a cleaning solution prior to use. For the foregoing reasons, there is a need for a machine and method that addresses these limitations.

Known jewelry cleaning devices do not allow for a manual cleaning option in a game-like, entertaining format, as hereinafter described. Further, known devices are limited in that they are designed for personal or commercial, rather than public, use. None of these known devices are available in a public readily accessible format and provide for the ability to clean the jewelry and return it to the user in a dry, ready-to-wear manner in a matter of minutes.

The exemplary embodiments of the present invention have a dual purpose of utility and entertainment.

Embodiments permit a user to direct cleaning solution to user-selected portions of the jewelry so that cleaning solution can be focused on the portions of the jewelry. Thus, exemplary embodiments of the invention provide a jewelry washing machine utilizing nozzles that will direct a wash fluid, under pressure, onto each of the facets of the jewelry for a preset time period. The jewelry will be secured in place by the user to a support bracket near the center of the machine. Certain types of jewelry will be affixed to an appropriate sleeve which can be secured to the support bracket. The orientation of the support bracket may be user-controlled. The washing cycle will be followed by a drying cycle that will direct a stream of air onto the jewelry utilizing piping and a diffuser connected to a blower.

Exemplary embodiments permit manual cleaning option in a game-like, entertaining format. Additional advantages and novel aspects of embodiments of the invention will be apparent from the following disclosure. Exemplary embodiments of the invention provide for entertaining a user by enabling the user to manually direct the wash fluid onto the jewelry by using a trackball or touch pad to rotate the support bracket and the attached jewelry during the washing cycle.

Exemplary embodiments of the invention provide a display cabinet that houses a transparent cylindrical wash chamber, the nozzles used for spraying the wash fluid on the jewelry during the washing cycle, a portion of the tubing used to transport the wash fluid from a reservoir through a pump to the nozzles during the washing cycle, a portion of the piping used to transport air from a blower to the jewelry during the drying cycle, two vent fans, and the support bracket where the jewelry will be secured during the cleaning process.

According to exemplary embodiments of the invention, if the user desires to self-clean the jewelry, in the manual mode of operation, the user can utilize a trackball or touch pad to rotate the support means so that the spray of wash fluid will come into contact with the attached jewelry at locations selected by the user. In addition, the base cabinet will house a computer, wash fluid return assembly, wash fluid reservoir, a pump, tubing to transport the wash fluid to the nozzles in the display cabinet, a blower, a portion of piping to transport air from the blower to the diffuser in the display cabinet, and a motor to raise and lower the cylindrical wash chamber to seal within the display cabinet during operation.

In exemplary embodiments, the wash fluid is filtered water, preferably through reverse osmosis or deionization filtration methods. Also, in exemplary embodiments, the wash fluid quality detector measures the concentration of total dissolved solids in the wash fluid. Other detectors and parameters may be used for monitoring depending on the wash fluid quality which will largely be dependent upon the environment in which the machine is used. Other types of wash fluid may be employed as well.

In exemplary embodiments, wash fluid is stored in a reservoir beneath the display cabinet. A pump sprays wash fluid onto the jewelry, and used wash fluid is recovered, filtered and reused resulting in a self-contained operation. Periodically, wash fluid is replaced to ensure continued wash quality. A computer controller will be used for controlling the process, recording pertinent data and providing service notifications when needed.

DESCRIPTION OF EXEMPLARY EMBODIMENTS

Figure 1:
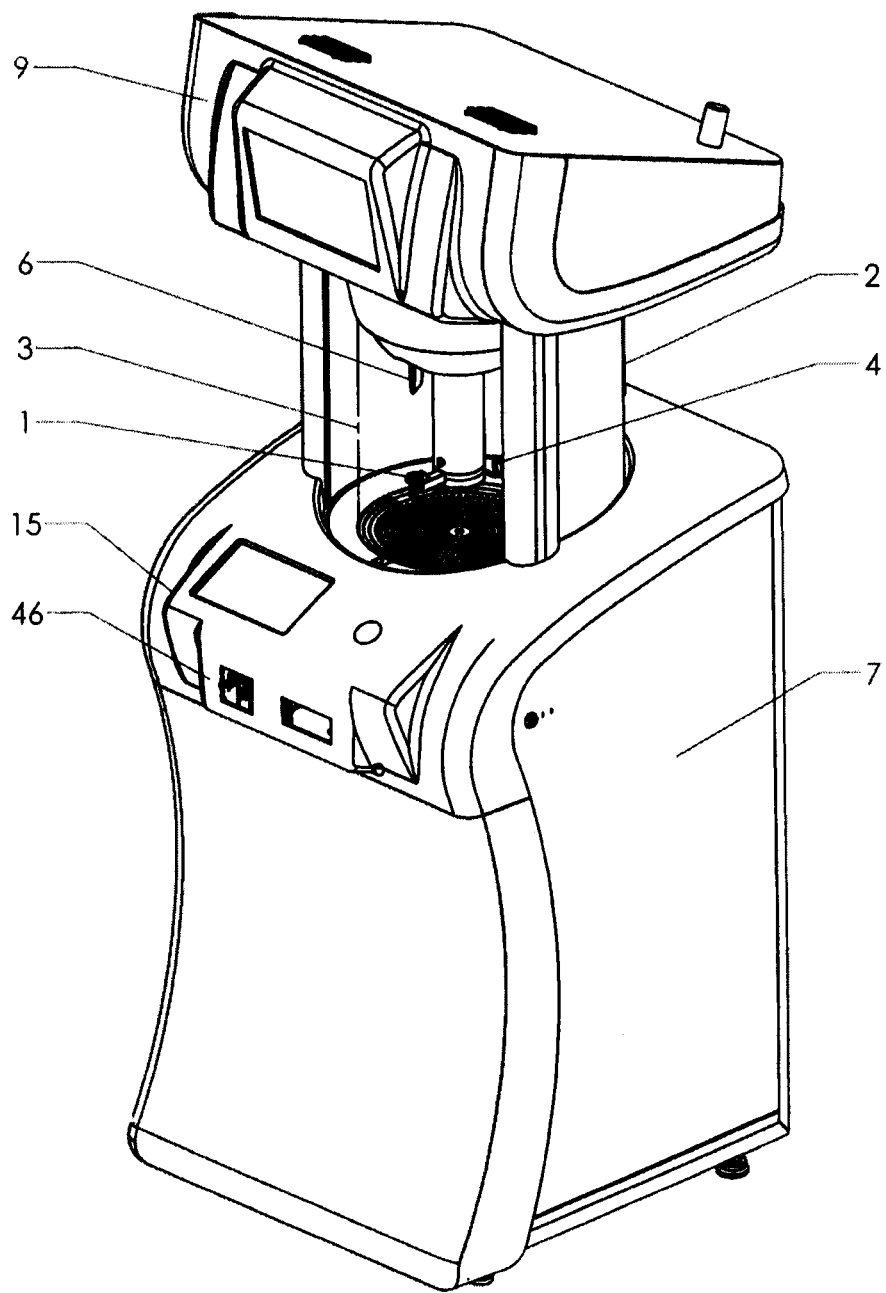
FIG. 1 is a perspective view of the exterior of the machine.
Figure 2:
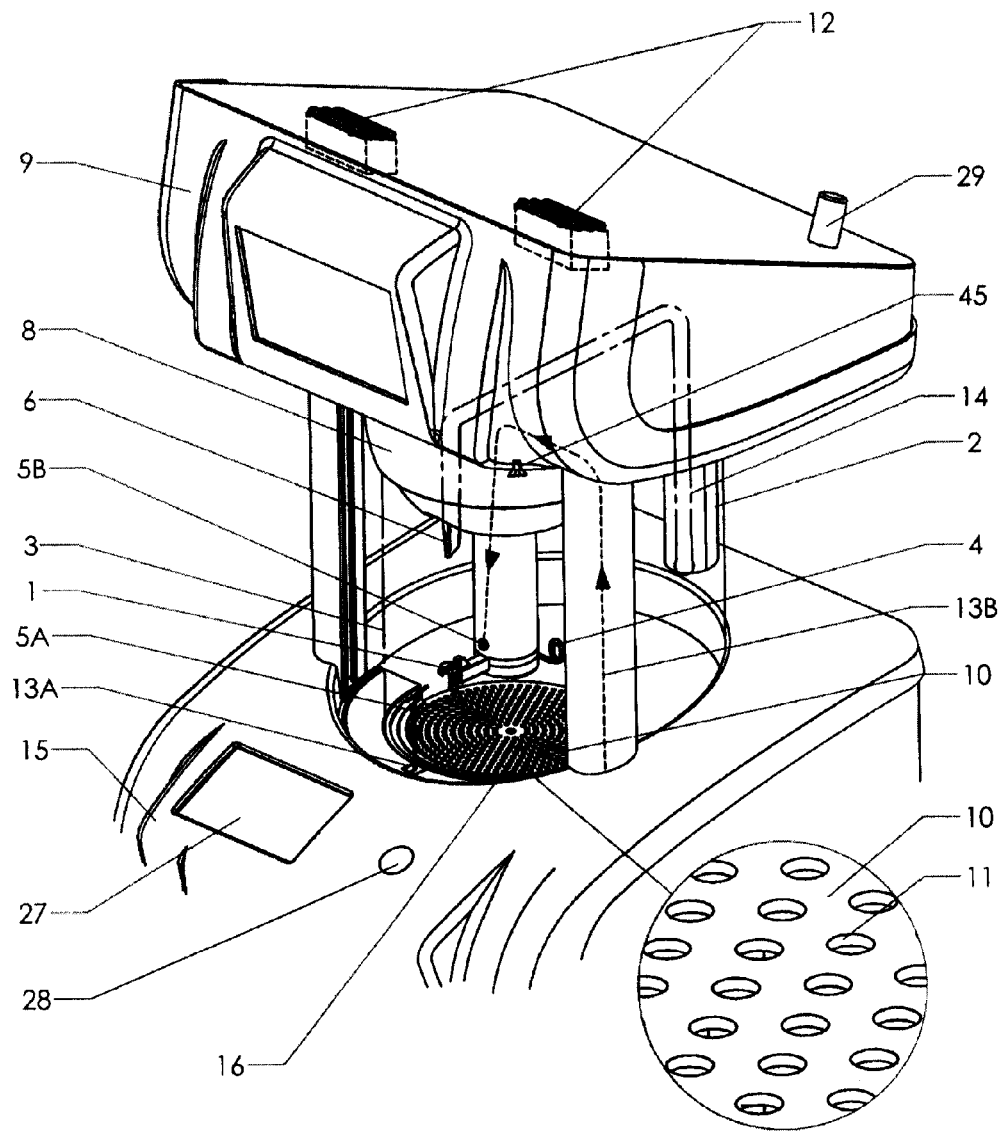
FIG. 2 is an isolated view of the interior of the display cabinet and the upper portion of the operations panel.

Referring now to the drawings, wherein referenced characters designate like or corresponding parts throughout the several views, there is shown in FIG. 1, an exemplary embodiment of the machine. A ring 1 in FIGS. 1 and 2 is shown for illustrative purposes only and is not part of the machine. The hollow display cabinet 2 of the machine is made of a durable, transparent material and is of sufficient size in order to accommodate the cylindrical wash chamber 3, the support bracket 4, tubing 13A, 13B, piping 14, nozzles 5A, 5B, and a diffuser 6, respectively, as shown in FIG. 2. Further, the display cabinet 2, the cylindrical wash chamber 3 must be sufficiently sized so that when the display cabinet 2 and the cylindrical wash chamber 3 are open, the user of the machine is able to insert his hands inside the display cabinet 2 and cylindrical wash chamber 3 and attach a ring 1 or other type of jewelry to the support bracket 4. In this embodiment, the display cabinet 2 is cylindrical in shape with a sliding front door (not shown) and includes a safety mechanism such that the machine's washing and cleaning operations are incapable of functioning unless the display cabinet is closed. Another safety mechanism is employed to prevent the premature closing of the cylindrical wash chamber 3 before a user removes his hands from the machine. The display cabinet 2 is supported by the control cabinet 7.

The cylindrical wash chamber 3 when closed and, as shown in FIG. 2 seals to an inverted dome 8 located on the ceiling of the display cabinet 2. In this embodiment, the cylindrical wash chamber has an approximate diameter of 12 inches. To open the cylindrical wash chamber 3, the chamber 3 is lowered vertically downward within the control cabinet 7. When in motion, the chamber 3 is in contact with a gasket 16 to remove wash fluid droplets that adhere to its interior surface. To close the chamber 3, it is raised a set distance until it creates a water tight seal with the inverted dome 8.

Figure 3:
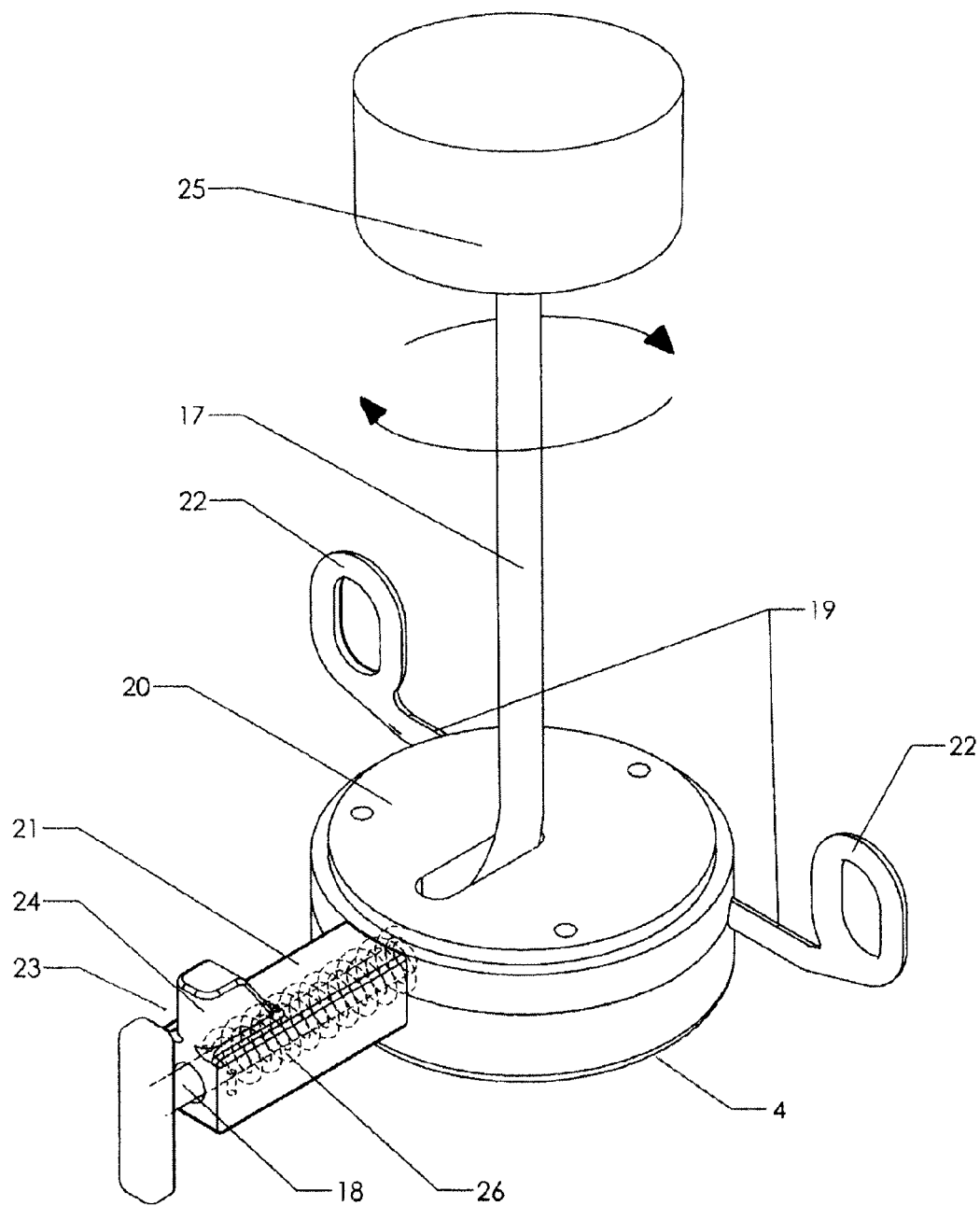
FIG. 3 is an isolated view of the support bracket.

Mounted near the center of the display cabinet 2 and the chamber 3 when closed there is a support bracket 4, which, as shown in FIGS. 2 and 3, is attached to gear assembly 25 located in the top 9 of the display cabinet 2. As shown in FIG. 3, the support bracket 4 comprises a stem 17, two linear bars 19, which are opposite one another and emanating from the rear edge of a disc 20, a bracket bar 21, which protrudes from the front of the disc 20 perpendicular to the linear bars 19, and a holding assembly 18 attached to the end of the bracket bar 21 that is opposite the stem 17. In this embodiment, the stem 17 is cylindrical in shape and has a length of approximately 12 inches and a diameter of approximately 0.5 inches. The stem 17 connects to a gear assembly 25 located in the top 9 that enables the support bracket 4 to rotate from side to side. The linear bars 19 can be cylindrical in shape with an approximate diameter of 0.5 inches and each have a length of approximately four inches. Further, the linear bars 19 each have, extending vertically at their outermost end, a loop 22 as shown in FIG. 2 which accommodates the ends of necklaces. The bracket bar 21 is also rectangular in shape with an approximate length of three inches. Contained within the bracket bar 21 is a resilient member (e.g., spring 26) connected to the disc 20 and the holding assembly 18. Attached at the end of the bracket bar 21, which is opposite the end attached at the disc 20, is the holding assembly 18, which further comprises a vertically-aligned cradle or notch 23, with a fastener 24 molded into the cradle 23, which secures the jewelry during operation of the machine. In this embodiment the fastener 24 is metal with a polyethylene cover.

The support bracket 4 is capable of accommodating jewelry (e.g., ring 1) of varying types, sizes and shapes. The cradle 23 and the fastener 24, with a polyethylene cover further provide a slip resistant surface for the ring 1. Further, as shown in FIG. 3, the tensile strength of the spring connecting the holding assembly 18 and the disk 20 is calibrated to snugly clamp the inner and outer surfaces of the ring 1. The slip resistance and secure hold of the support bracket 4 elements are necessary so that the ring 1 or other types of jewelry remains stationary throughout the washing and drying cycles and through the various movements created by the gear assembly 25. The support bracket 4 firmly supports the ring 1 and other types of jewelry, and because only a small portion of the ring 1 is covered by the holding assembly 18 this provides the greatest available surface area for wash fluid 39 contact and cleaning purposes.

As shown in FIGS. 1 and 2, the bottom center of the display cabinet 2 includes a drain 10 with a diameter approximately the same as the cylindrical wash chamber 3. The drain is underlain by a fabric filter 11. This drain 10 and fabric filter 11 acts as a secondary containment device to catch fallen jewelry or any gems or objects that are inadvertently dislodged from jewelry during cleaning. The top 9 is also equipped with two vent fans 12 and an antenna 29 for receiving and transmitting information. An operations panel 15 is situated in front of the display cabinet 2 and includes a touch screen 27 and a trackball 28 so the user can operate the machine. The operations panel 15 also includes a payment center 46 where the user can choose his method of payment. In the exemplary embodiment the payment center 46 allows the user to pay using cash, credit or debit card, or through an electronic transaction (e.g., smart phone application with code retrieval and input). The operations panel 15 is operatively connected to the computerized controller 42.

Figure 4:
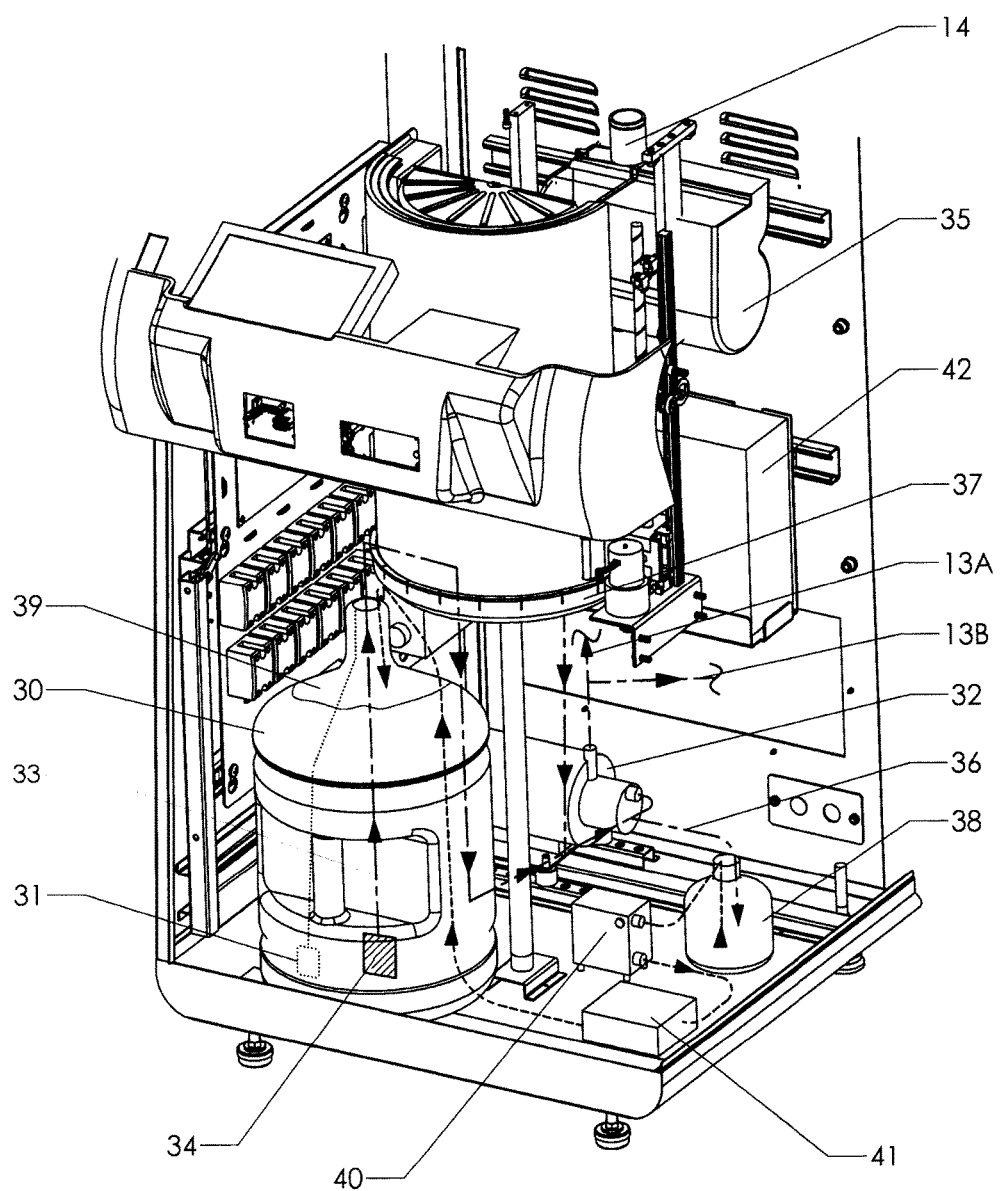
FIG. 4 is an interior view of the machine's base cabinet and its components.

Referring to FIG. 4, the wash fluid reservoir 30 is made of a durable, non-corrosive material and is located at the bottom in the interior of the base cabinet 12. The weight of the wash fluid 39 stored in the wash fluid reservoir 30, further aids in stabilizing the machine. A wash fluid quality detector 31 is placed the wash fluid reservoir 30, as shown in FIG. 4. In exemplary embodiments of the invention, the wash fluid reservoir 30 has a 5-gallon capacity and is a standard water bottle. Further the wash fluid quality detector measures total dissolved solids in the wash fluid 39. The preferred wash fluid 39 is water filtered through reverse osmosis or other filtration methods.

The use of water filtered with reverse osmosis at ambient temperature as the wash fluid 39 has distinct advantages over other options considered and used by others. First, because the wash fluid 39 is water, there will not be a need for special handling, management of materials, or concerns over leakage. This would be the case if other solvents were used. Second, reverse osmosis water normally has a pH which is slightly less than normal (pH of 7). Therefore, the use of reverse osmosis water as a wash fluid 39 helps to dissolve solids which are adhering to the ring 1. Third, because of its lower mineral content, reverse osmosis water will prevent spotting on the ring 1. Fourth, application of the reverse osmosis water at ambient temperature avoids the need to heat or convert the wash fluid 39 to jet of steam or mist. A final advantage of the reverse osmosis water over other types of wash fluids is the ability to regenerate and reuse the wash fluid 39 once it is determined to be ineffective. The ability to reuse a large percentage of wash fluid 39 greatly increases the cost efficiency and the environmental friendliness of the machine. Also, the ability to use common water filtration devices to filter and recycle used wash fluid 39 allows for greater operating times between wash fluid change outs.

As shown in FIG. 4, a pump 32 is mounted inside the base cabinet 12. A suction hose 33 is attached at one end to the pump 32 and extends from the pump 32 into the wash fluid reservoir 30 near its base. The end of the suction hose 33 has an in-line filter 34 attached to it. When the machine is operating during the washing cycle, the pump 32 will draw wash fluid 39 from the wash fluid reservoir 30, through the in-line filter 34 and through the suction hose 33. The wash fluid 39 is then conveyed from the pump 32 through tubing 13A, 13B, which are connected at the pump 32 outlet. A blower 35 is mounted in the base cabinet. As shown in FIGS. 2 and 4, the tubing 13A, 13B and piping 14 extend up from the pump 32 and the blower 35, respectively, through the base cabinet 12 and into the display cabinet 2. As shown in FIGS. 2 and 3, tubing 13A and 13B extend and connect to nozzles 5A and 5B to a point approximately 3 inches in front and behind of the holding assembly 18 when the cylindrical wash chamber 3 is closed. The center of the diffuser 6 will be aligned horizontally with the holding assembly 18 and situated approximately 5 inches above the ring 1 when attached to support bracket 4. In this embodiment, the pump 32 has an operating pressure range of at least 200 to no greater than 1,000 pounds per square inch (psi). The preferred application pressure is at least 250 psi and no more than 300 psi.

Referring to FIG. 4, there is an accordion drain line 36 (illustrated as a dashed line) that is attached to the catch-pan 37 that supports the cylindrical wash chamber. Used wash fluid 39 collects in the catch-pan 37 following the washing cycle and drains through the accordion drain line 36 into a collector 38. A transfer pump 40 pumps used wash fluid 39 through a filter series 41 and returns the wash fluid to the reservoir 30. In exemplary embodiments, the filter series 41 comprises an ultraviolet light filter followed by a carbon filter, and the collector 38 has a capacity of one-half gallon. Other filtration methods may include reverse osmosis or ion exchange and can be considered in series or in isolation depending on the filtration demand.

As shown in FIGS. 1, 2 and 3, the exterior of the operations panel 15 includes a trackball 28, which controls the gear assembly 25, and a touch screen 27 to allow the user to interact with the computerized controller 42. The machine also includes one or more audio speakers 45 which allow for audio communication with the user depending on the machine status. In automatic mode, the computerized controller 42, which, as shown in FIG. 4, is mounted in the base cabinet 12, will activate the gear assembly 25 causing the support bracket 4 to rotate side-to-side. As shown in FIG. 3, this rotation will deflect the loops 22 approximately one-half inch in each direction from the support bracket's 4 starting position during both the wash cycle and drying cycle. This will allow for all parts of a common ring 1 or other jewelry to be fully exposed to the nozzles 5A and 5B, and the diffuser 6 during the washing cycle and drying cycle, respectively. When the machine is being operated in manual mode, the user can activate the gear assembly 25 and cause the support bracket 4 to rotate by moving the trackball 28. Alternatively, the trackball 28, as well as the touch screen 27 can be eliminated in which case the machine would always function in automatic mode. Instead of the touch screen 27, a touchpad may be used.

Other input devices, such as a joystick, a directional keypad, etc. may also be used in addition to or instead of the trackball 28. According to the present example, when the machine is being operated in manual mode, the trackball 28 is both durable and requires limited motion to be affected, and has been found by the inventor to be more appealing to young children who use the machine.

Further, the computerized controller 42 activates a sliding motor 43, as shown in FIG. 4 that will rotate the display cabinet 2 to an open position allowing the user to secure the ring 1 to the support bracket 4. Once the ring 1 is secured and hands are cleared from the machine, the computerized controller 42 activates a lift motor 44 that will raise the cylindrical wash chamber 3 to a closed position. The computerized controller 42 also activates sliding motor 43 to close the display cabinet 2. The computerized controller 42 will then initiate the wash cycle by activating the pump 32 for a preset time period and then initiate the drying cycle by activating the blower 35, which operates for a preset time period. Near the conclusion of the machine's drying cycle, the computerized controller 42 activates the two vent fans 12 which will operate for a preset period to evacuate residual moisture in the cylindrical wash chamber 3. The computerized controller 42 completes the process by opening the cylindrical wash chamber 3 with the lift motor 44 and the display cabinet 2 with the sliding motor 43 to allow the user to remove his ring 1 from the support bracket 4.

The computerized controller 42 is also capable of transmitting data and messages communicating wirelessly via the antenna 29. The computerized controller 42 will perform system diagnostics periodically to ensure the machine is in service. Because it is anticipated that machines will be located at various locations of greatest need, communications with a central operator or technician is necessary to ensure timely maintenance. The technology for the exchange of operational status information via wireless communication or wireline has been previously disclosed in applications such as US2010/0268792 and is incorporated herein by reference. These systems may be integrated or utilized wholly or partially in various embodiments to maintain communications amongst the machines in service and the operator or technician.

Figure 5A:
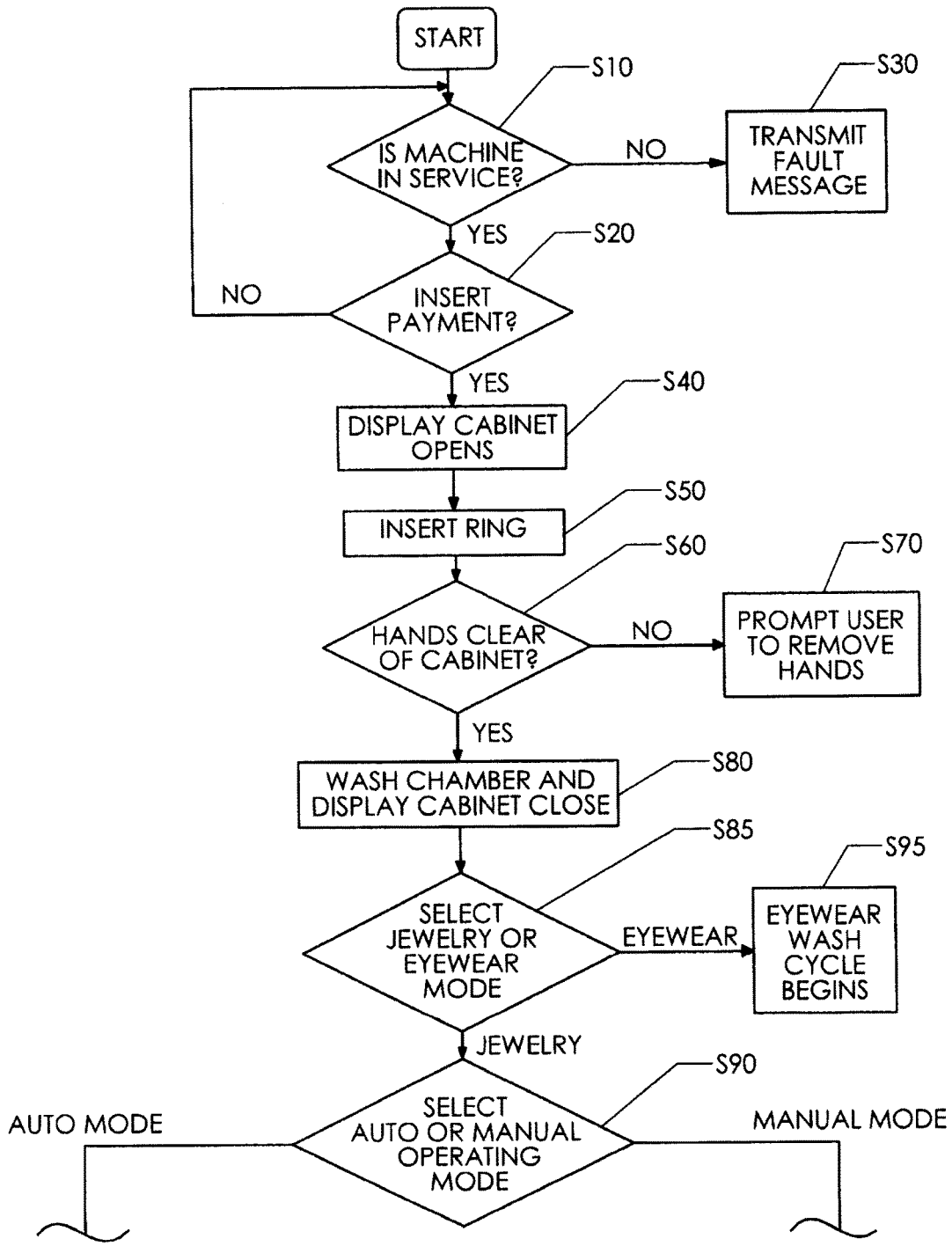
FIGS. 5A and 5B are a process flow algorithm for the machine when in operation.
Figure 5B:
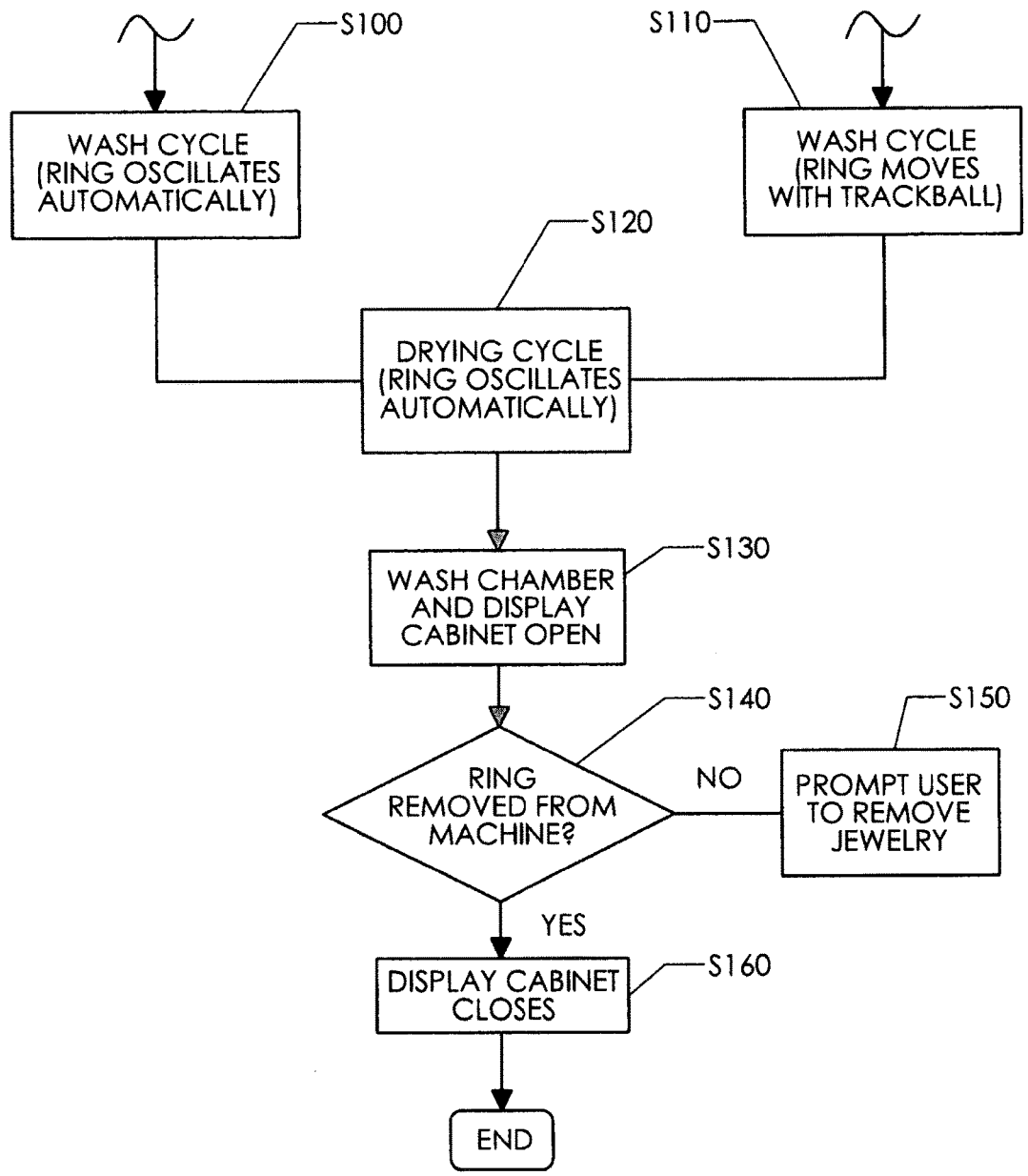

Next, the jewelry washing method is described with reference to FIGS. 5A and 5B. In this exemplary embodiment, a ring 1 is used to demonstrate the functionality of the machine. The method is executed by the computerized controller 42 by executing a program stored thereon when the machine is turned on. First, as shown in FIG. 5A, the computerized controller will determine whether or not the machine is in service (Step S10). If there is a fault in the machine (Step S10: No) the computerized controller 42 transmits an appropriate fault message (Step S30) to an operator or technician. If the machine is in service (Step S10: Yes), the machine prompts the user to insert payment (Step S20). If payment is not received (Step S20: No), the machine returns to ready mode (Step S10). If payment is received (Step S20: Yes), the display cabinet 2 opens (Step S40) and the user inserts his ring 1 into the support bracket 4 (Step S50).

If the user's hands or other objects remain in the machine (Step S60: No), the user is prompted via the speakers 45 and the touch screen 27 to remove hands or articles from the machine (Step S70). Once the user's hands are removed from the display cabinet 2 (Step S60: Yes), the cylindrical wash chamber 3 and the display cabinet 2 will close (Step S80). Referring to FIG. 5A, the user will select either the jewelry or eyewear cleaning mode (Step S85). Should the user select the eyewear cleaning mode (Step S95: Eyewear) the method description provided in application Ser. No. 13/437,238 is followed. For the method description of this embodiment, the jewelry cleaning mode is selected (S85: Jewelry). Referring to FIGS. 5A and 5B, the user selects either an automatic or manual mode of operation (Step S90). In the automatic mode (Step S100) (Step S90: Auto), the computerized controller 42 will oscillate the support bracket 4 and the ring 1 throughout as wash fluid 39 is sprayed onto the ring for a preset time period. If the manual mode (Step S110) (Step S90: Manual), the user guides the support bracket 4 with the trackball 28 to allow wash fluid 39 to come in contact with selected parts of the ring 1 over a preset time period.

The drying cycle (Step S120) follows the wash cycle. The computerized controller 42 automatically oscillates the support bracket 4 and the ring 1 and operates the blower 35 for a preset time period. The computerized controller turns off the blower and activates the two vent fans 12 which again operate for a preset period to complete the drying cycle (Step S120). After the drying cycle the cylindrical wash chamber 3 and the display cabinet 2 open (Step S130). The user removes the ring 1 from the machine (Step S140: Yes). If the user fails to remove his jewelry (Step S140: No), the user is prompted via the speakers 45 and the touch screen 27 to remove hands and jewelry (Step S150). Once the user retrieves his ring 1 the display cabinet 2 closes (Step S160). The computerized controller will determine if the machine remains in service. (Step S10) and the process is repeated.

Figure 6:
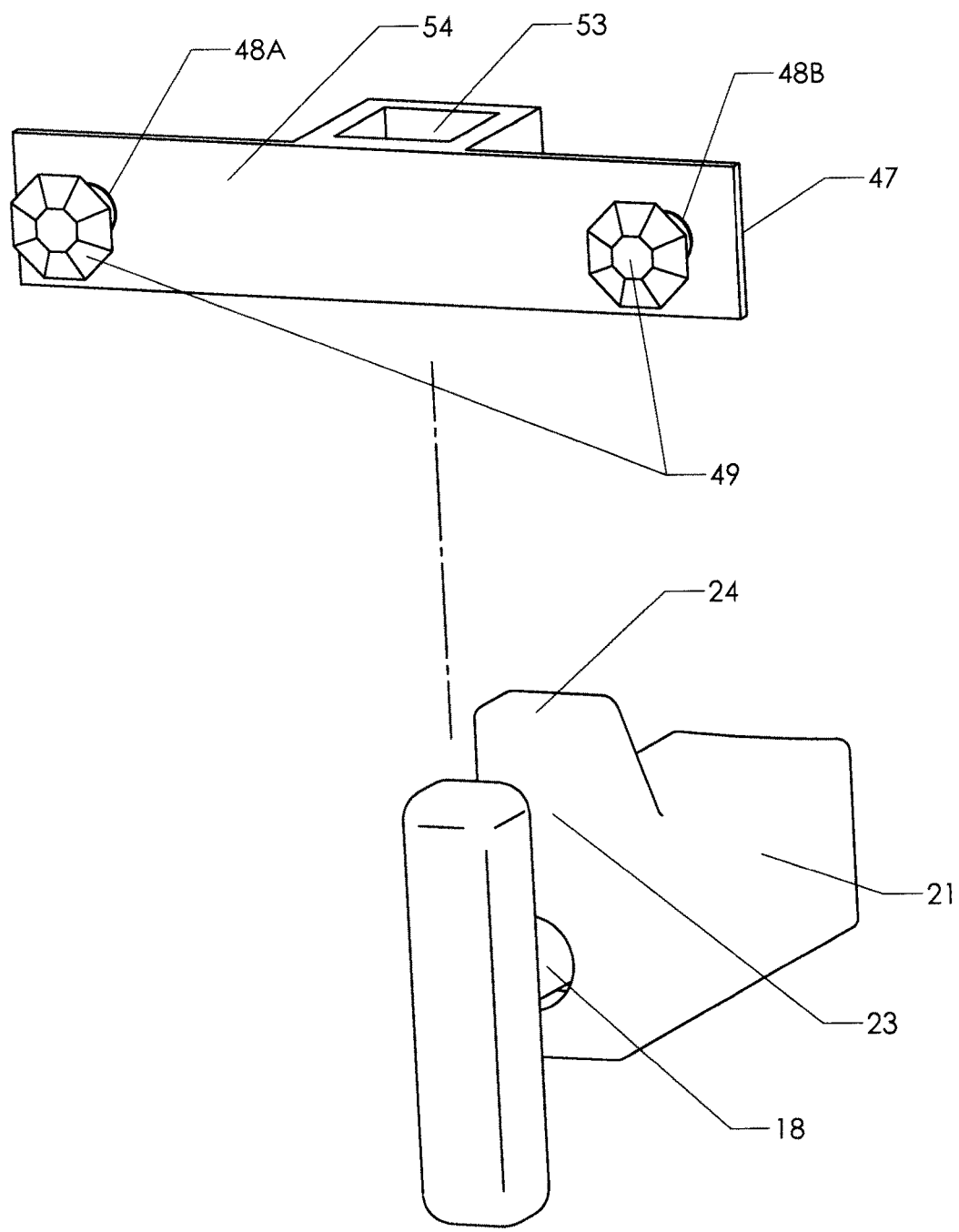
FIG. 6 is a perspective view of an ear ring sleeve embodying its connection to the support bracket of FIG. 3.

The machine is easily adaptable to accept multiple types of jewelry in addition to the ring 1 and the necklace applications through various attachments. For instance, as shown in FIG. 6, an ear ring sleeve 47 comprises a mounting plate 54 with at least two holes 48A and 48B connected at its center to a channel 53 that is sized to fit snugly over the holding assembly 18. In this embodiment, the user mounts ear rings 49 to the mounting plate 54 and slides the ear ring sleeve 47 over the holding assembly 18 through the channel 53. (FIG. 5A, Step: S50). The ear ring sleeve 47 can be made of material such as rigid formed foam plastic. The mounting plate 54 has a length of approximately 4 inches and a height of approximately 0.5 inches.

Figure 7:
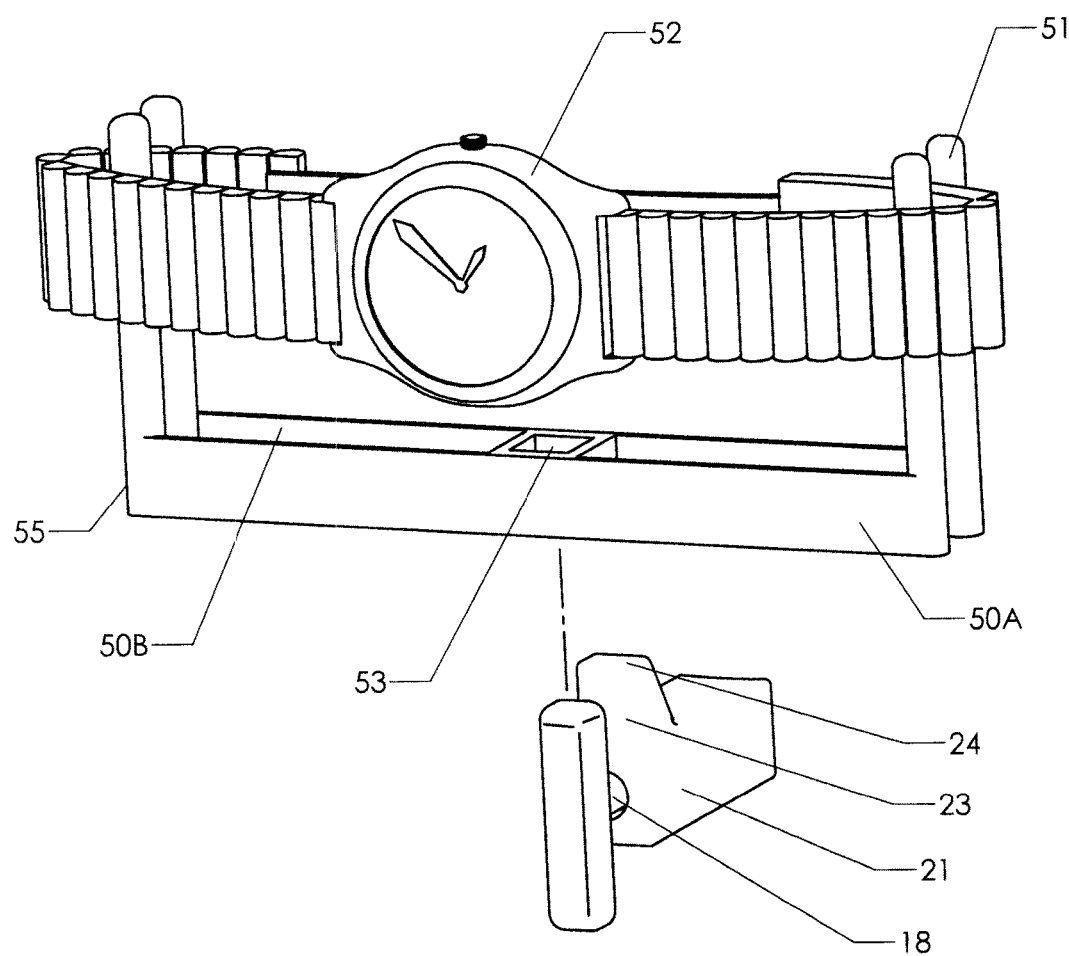
FIG. 7 is a perspective view of a wrist-watch sleeve embodying its connection to the support bracket of FIG. 3.

For another example, as shown in FIG. 7, a wrist-watch sleeve 55 comprises two base plates 50A and 50B connected at their center to a channel 53 that is sized to fit snugly over the holding assembly 18. The ends of the base plates 50A and 50B are connected to four mounting posts 51. The base plates 50A and 50B range in length from 3 inches to 4 inches. The mounting posts 51 are approximately 2 inches in height with a diameter of approximately 0.25 inches. In this embodiment, the user selects a sleeve which is the appropriate size for the wrist-watch 52 being washed. The user then slides the wrist-watch 52 over the mounting posts. Two, three or four mounting posts 51 can be used depending on the user wrist size. Once the wrist-watch 52 is secured, the user slides the wrist-watch sleeve 55 over the holding assembly 18 through the channel 53. (FIG. 5A, Step: S50). The wrist-watch sleeve 55 can be made of material such as rigid formed foam plastic.

As shown in FIGS. 6 and 7, and FIG. 3, the support bracket 4, bracket bar, 21, cradle 23 and the fastener 24, with a polyethylene cover further provide a slip resistant surface for the ear ring sleeve 47 or wrist-watch sleeve 55. Further, as shown in FIG. 3, the tensile strength of the spring connecting the holding assembly 18 and the disk 20 is calibrated to snugly clamp and hold the channel 53 on the holding assembly 18. The slip resistance and secure hold of the support bracket 4 elements are necessary so that the ear rings 49 and the wrist-watch 52 remain stationary on the holding assembly 18 throughout the washing and drying cycles and through the various movements created by the gear assembly 25.

The machine, attachments and accompanying method described in the embodiments above provide an improvement over the related art because the machine is be readily available at locations of greatest need. Further, the machine and method are simple to use and allow the user the option to isolate wash fluid on the dirtiest part of the jewelry. The machine includes a display cabinet, cylindrical wash chamber, operations panel, and a control cabinet.

While various features have been described in conjunction with the examples outlined above, various alternatives, modifications, variations, and/or improvements of those features and/or examples may be possible. Accordingly, the examples, as set forth above, are intended to be illustrative.

Various changes may be made without departing from the broad spirit and scope of the underlying inventive principles.

For example, a version may be presented without the touch screen 27 or the payment center 46. It is conceivable that, depending on the desired machine performance, the filter series 41 could be totally or partially bypassed or that other filtration methods may be employed. Also, because it is not critical to the operation, the display cabinet 2 could remain in the open position while the machine is operating. Additionally, the holding assembly 18 could be modified to fit the type of jewelry most frequently washed. Therefore, the spirit and scope of the appended claims should not be limited to the description of the preferred versions and operating parameters and process contained herein.

What is claimed is:

1. A jewelry cleaning device, comprising:
    a wash chamber;
    a support bracket located within the wash chamber, the support bracket being configured to support jewelry within the wash chamber, the support bracket being mounted within the wash chamber on a single rotatable stem that protrudes from a ceiling of the wash chamber, an axis of rotation of the stem being parallel to the stem;
    at least one nozzle located within the wash chamber and configured to direct wash fluid onto the jewelry when the jewelry is supported by the support bracket;
    an input device configured to receive input from a user of the jewelry cleaning device; and
    a controller configured to:
        receive an input signal from the input device; and
        based on the received input signal, rotate the stem about the axis of rotation to change the orientation of the support bracket relative to the at least one nozzle while the at least one nozzle is expelling the wash fluid.

2. The jewelry cleaning device of claim 1, wherein the support bracket is configured to support various types and sizes of jewelry within the wash chamber.

3. The jewelry cleaning device of claim 1, wherein the support bracket comprises:
    a support;
    two bars protruding in generally opposite directions from the support, each bar configured to accept a corresponding ends of jewelry when the jewelry is supported by the support bracket; and
    a bracket bar oriented generally perpendicular to each of the two bars and configured to support the jewelry when the jewelry is supported by the support bracket.

4. The jewelry cleaning device of claim 3, wherein each of the two bars comprises a loop disposed at one end of the bar, each of the loops being configured to allow the corresponding ends of jewelry to pass through the loop when the jewelry is supported by the support bracket.

5. The jewelry cleaning device of claim 3, wherein the bracket bar further comprises:
    a holding assembly; and
    a resilient member, the resilient member being connected to the holding assembly and the support, the resilient member configured to apply sufficient force to the jewelry to secure the jewelry on the support bracket against a force of the wash fluid when the jewelry cleaning device is in operation.

6. The jewelry cleaning device of claim 3, wherein the bracket bar is about 3 inches long.

7. The jewelry cleaning device of claim 3, wherein each of the two bars is about 4 inches long.

8. The jewelry cleaning device of claim 1, further comprising:
    an internal space configured to accept a fluid reservoir for holding the wash fluid; and
    a filter system configured to filter the wash fluid.

9. The jewelry cleaning device of claim 8, wherein the filter system comprises a reverse osmosis filter.

10. The jewelry cleaning device of claim 8, further comprising: the fluid reservoir configured to hold the wash fluid.

11. The jewelry cleaning device of claim 10, further comprising:
    a drain disposed below the support bracket and configured to collect used wash fluid, the used wash fluid being wash fluid that has exited the at least one nozzle.

12. The jewelry cleaning device of claim 11, further comprising:
    a wash fluid conveyance system configured to:
        transport wash fluid from the fluid reservoir to the at least one nozzle; transport the collected used wash fluid from the drain to the filter system; and
        transport filtered wash fluid from the filter system to the fluid reservoir.

13. The jewelry cleaning device of claim 12, wherein the fluid conveyance system comprises a pump configured to deliver the wash fluid to each of the at least one nozzles in a pressure range between 200 and 1000 psi.

14. The jewelry cleaning device of claim 1, wherein:
    the input device comprises at least one of:
        a trackball;
        a joystick;
        a directional keypad;
        a touchpad; and
        a touch screen; and
    the input signal received from the input device specifies a direction of a change in the orientation of the support bracket; and
    based on the received input signal, the orientation of the support bracket is changed relative to the at least one nozzle according to the specified direction of the change in orientation, while the at least one nozzle is expelling the wash fluid.

15. The jewelry cleaning device of claim 1, further comprising:
    a payment center configured to accept at least one of cash or electronic payment;
    wherein the controller is configured to:
        receive a signal from the payment center indicating that the payment has been accepted;
        cause a door of the wash chamber to open;
        cause a door of the wash chamber to close;
        control a wash fluid conveyance system to supply the wash fluid to the at least one nozzle; and
        change the orientation of the support bracket relative to the at least one nozzle in response to the received input signal while the wash fluid conveyance system is supplying the wash fluid to the at least one nozzle.

16. The jewelry cleaning device of claim 1, wherein:
    the received input signal indicates a selection of an automatic mode; and
    in response to the selection of the automatic mode, the controller changes the orientation of the support bracket by automatically causing the support bracket to oscillate relative to the at least one nozzle.

17. The jewelry cleaning device of claim 1, wherein the at least one nozzle comprises a first and a second nozzle, the first nozzle configured to direct fluid at a front surface of the jewelry when the jewelry is supported by the support bracket, the second nozzle configured to direct fluid at a rear surface of the jewelry when the jewelry is supported by the support bracket.

18. The jewelry cleaning device of claim 1, further comprising:
   a diffuser configured to dry the jewelry when the jewelry is supported by the support bracket; and
   an exhaust configured to exhaust residual moisture from the wash chamber.

19. A method for operating a jewelry cleaning device, comprising:
   supporting jewelry on a support bracket within a wash chamber, the support bracket being mounted within the wash chamber on a single rotatable stem that protrudes from a ceiling of the wash chamber, an axis of rotation of the stem being parallel to the stem;
   directing wash fluid from at least one nozzle onto the jewelry when the jewelry is supported by the support bracket;
   receiving an input signal from a user of the jewelry cleaning device; and
   rotating the stem about the axis of rotation to change the orientation of the support bracket relative to the at least one nozzle based on the received input signal while the at least one nozzle is expelling the wash fluid.

20. A jewelry cleaning device comprising:
   supporting means for supporting jewelry within a wash chamber, the support means being mounted within the wash chamber on a single rotatable stem that protrudes from a ceiling of the wash chamber, an axis of rotation of the stem being parallel to the stem;
   means for directing wash fluid onto the jewelry when the jewelry is supported by the supporting means;
   means for receiving input signal from a user of the jewelry cleaning device; and
   means for rotating the stem about the axis of rotation to change the orientation of the support means relative to the means for directing wash fluid onto the jewelry based on the received input signal while the means for directing wash fluid onto the jewelry is expelling the wash fluid.

* * * * *